United States Patent
Beitans (12)

(10) Patent No.: US 11,135,522 B2
(45) Date of Patent: Oct. 5, 2021

(54) VERTICAL WIND TUNNEL WITH IMPROVED SAFETY FEATURES

(71) Applicant: Ivars Beitans, Sigulda (LV)

(72) Inventor: Ivars Beitans, Sigulda (LV)

( * ) Notice: Subject to any disclaimer, the term of this patent is extended or adjusted under 35 U.S.C. 154(b) by 0 days.

(21) Appl. No.: 16/961,929

(22) PCT Filed: Jan. 19, 2018

(86) PCT No.: PCT/IB2018/050360
§ 371 (c)(1),
(2) Date: Jul. 14, 2020

(87) PCT Pub. No.: WO2019/142019
PCT Pub. Date: Jul. 25, 2019

(65) Prior Publication Data
US 2020/0338461 A1     Oct. 29, 2020

(51) Int. Cl.
*A63G 31/00* (2006.01)
*G01M 9/00* (2006.01)

(52) U.S. Cl.
CPC ........ *A63G 31/00* (2013.01); *A63G 2031/005* (2013.01)

(58) Field of Classification Search
CPC ........ A63G 31/00; A63G 31/04; A63G 31/16; G09B 9/00; G09B 9/08; G09M 9/00
USPC ............................................. 472/137; 73/147
See application file for complete search history.

(56) References Cited

U.S. PATENT DOCUMENTS

| | | | | |
|---|---|---|---|---|
| 4,700,565 A | * | 10/1987 | Albuschkat | A63G 31/00 472/137 |
| 6,139,439 A | * | 10/2000 | Ure | A63G 31/00 434/258 |
| 7,572,189 B2 | * | 8/2009 | Gentile | A63G 31/00 434/247 |

* cited by examiner

*Primary Examiner* — Kien T Nguyen
(74) *Attorney, Agent, or Firm* — Patshegen IP LLC; Moshe Pinchas

(57) ABSTRACT

A vertical wind tunnel for raising persons by use of air flow, comprising a flight platform (1), an air flow generating device (2) associated with the flight platform (1) and generating a vertical air flow through a channel (3) arranged in a middle of the flight platform (1). The flight platform (1) comprises a safety mattress (4) positioned around the channel (3); a net assembly (5) comprising a flexible net ring (6) and a net (7). The flexible net ring (6) is positioned around the channel (3) and above the safety mattress (4). The vertical wind tunnel further comprises an upholstery ring (8) arranged above the flexible net ring (6) for further absorption of impacts. The present invention increases a safety of its users effectively absorbing impacts of falling flyers.

12 Claims, 6 Drawing Sheets

VERTICAL WIND TUNNEL WITH IMPROVED SAFETY FEATURES

FIELD OF THE INVENTION

Invention relates to vertical wind tunnels, especially to open vertical wind tunnels and its safety features.

BACKGROUND OF THE INVENTION

The prior art discloses multiple open vertical wind tunnels comprising a frame structure in which a power unit is centrally disposed for providing vertical air flow. The tunnel further comprises a flight platform disposed above the power unit and a safety cushion disposed around the flight platform. The open vertical wind tunnels are made using different kind of metal structures. During use of the vertical wind tunnel, the flyer may fall and get hurt of these metal structures. Therefore, it is necessary to design a vertical wind tunnel so that possibility to get hurt is minimized.

United Kingdom patent application publication No. 2 290 484 discloses a mobile skydiving simulator consisting of a wheeled transportable trailer of open box design containing a power unit, an air permeable walk net and with platform decking sections that unfold to form a horizontal floor immediately surrounding the vertical air column produced by the machine. Another United Kingdom patent publication No. 2 288 772 discloses a skydiving simulator designed to be trailer-mounted so as to be readily transportable. A flight platform is mounted on a trailer alongside a fan. Similar design is disclosed in the U.S. Pat. No. 7,572,189.

U.S. Pat. No. 5,209,702 discloses a vertical wind tunnel housed in a building specifically designed for this purpose, having a hydraulic drive train consisting of two separate hydraulic motors, and a flight platform. The entire building is designed for noise abatement, and also has an earth "Berm" surrounding the building to redirect any noise escaping the building into an upward direction.

U.S. Pat. No. 4,700,565 discloses an open vertical wind tunnel comprising a device in the form of a supporting skeleton, which is adapted to be dismantled and transported and designed for set-up on a flat base, said device having a wind duct with a unit for accelerating the air and an associated air flow straightener arranged therein. The floating space is limited by nets for protecting the people floating therein. One net is arranged above the flow straightener and another net is disposed above the device.

SUMMARY OF THE INVENTION

The aim of the invention is to design an open vertical wind tunnel with improved safety to avoid any traumatic events during a use of the vertical wind tunnel.

The present invention is a vertical wind tunnel for raising persons by use of air flow, comprising a flight platform, an air flow generating device associated with the flight platform and generating a vertical air flow through an air flow channel arranged in a middle of the flight platform.

The flight platform comprises a safety mattress positioned around the air flow channel, a net assembly, an upholstery ring and a mattress cover.

The net assembly comprises a flexible net ring and a net. The flexible net ring is positioned around the channel and above or on the same level as the safety mattress and the flexible net ring comprises connectors for connecting the net to the net ring. The flexible net ring is designed to be resilient and elastic so, that the net ring may absorb energy by its deformation and return to its original size and shape when that influence or force (falling of the flyer) is removed. The flexible net ring is made of elastic material, preferably of fibre-reinforced polymer, more preferably of glass fibre reinforced plastic. The net ring may be made from another material as long as it has previously defined features regarding elasticity and ability to absorb energy. The connectors for connecting the net to the flexible net ring may be made by using any connector known to the skilled person. In one embodiment, the connector is in the form of holes in the flexible net ring and rings at the ends of each string of the net. Each ring of the string of the net is associated to each hole of the flexible net ring.

The upholstery ring is arranged above the flexible net ring and covers the flexible net ring. The upholstery ring is made of polyurethane, preferably of polyurethane foam. The density of the polyurethane is in the range of 25 kg/m3 to 100 kg/m3. The upholstery ring further absorbs impacts made by falling flyers, further increasing safety of the vertical wind tunnel.

The mattress cover is arranged above the safety mattress and the protective ring for covering and protecting from environmental impact. The mattress cover may be made of PVC or any other suitable material.

The vertical wind tunnel further comprises a flow straightener and a confusor. The flow straightener is positioned below the flight platform and after the propeller of the air flow generating device. The confusor is positioned between the flow and the net assembly, wherein a gap is formed between the confusor and the net assembly. The gap might be in the range of 30 cm to 50 cm. The gap allows primary deformation of the safety mattress and vertical movement of the net assembly, but absorbs the impact and decelerates the net assembly when it reaches the confusor.

The confusor is made of polyurethane, preferably of polyurethane foam. The density of the polyurethane is in the range of 25 kg/m3 to 100 kg/m3, preferably 35 kg/m3 to 50 kg/m3. In another embodiment it is 50 kg/m3. Use of polyurethane in the confusor makes it very good for absorbing impacts. The confusor may be made from another material as long as it has a necessary ability to absorb impacts.

The confusor is covered with a confusor cover to protect it from environmental impact. The confusor cover may be made of PVC or any other suitable material.

The vertical wind tunnel further comprises an air flow channel cover arranged around the channel enclosing thereof. The air flow channel cover is connected to the mattress cover. The air flow channel cover may be made of PVC or any other suitable material.

The vertical wind tunnel further comprises a peripheral frame structure spaced in distance around the air flow generating device, between which a safety mattress is positioned on a level of the flight platform.

The vertical wind tunnel further comprises flexible straps extending from the air flow generating device up to the peripheral frame structure. A first end of the flexible strap is attached to the air flow generating device and a second end of the flexible strap is attached to the peripheral frame structure, wherein the safety mattress is supported or suspended on the flexible straps. The flexible straps may be in the form of ropes, cable, wires, chains or nets used for lashing or securing of cargo for transportation.

Each flexible strap, at least to one of its ends, comprises a connector for easing assembly and dismantling of the vertical wind tunnel. The connector further comprises a tensioning member for tensioning the flexible strap for achieving and maintaining desired tension. The following tensioning members might be found in a transportation industry for securing of cargo.

In another embodiment, the first end of the flexible strap is attached to the flow straightener. Generally, the flexible strap may be attached to any suitable element of the power unit.

In another embodiment, the first end of the flexible strap attached to the power unit is positioned above or slightly above the second end of the flexible strap attached to the peripheral frame structure. Therefore, the flexible strap is inclined relative to the ground level on which the vertical wind tunnel is positioned. Due to the inclined arrangement, the water may be drained from the vertical wind tunnel to the periphery thereof.

It was surprisingly discovered that a use of flexible straps also improves the safety of the vertical wind tunnel. Due to flexibility or elasticity of the straps, the safety cushion supported on the straps is in suspended state. Hence, impacts and shocks made by a fall of a user of the tunnel are transferred not only to a structure of the safety cushion but also to the flexible straps. Therefore, the following design provides further amortization of fall of user of the tunnel increasing the safety.

In another embodiment, the vertical wind tunnel further comprises cross member arranged between the flexible straps connecting each other. Elastic members and cross member are arranged such that they form structure resembling a spider web. The connecting element may be in the form of a strap, a belt or a web.

The vertical wind tunnel further comprises sound absorbing walls, which are suspended on the flexible straps for absorbing of noise generated by the power unit. In another embodiment, the sound absorbing walls may be installed in the peripheral frame structure for absorbing of noise generated by the air flow generating device.

The vertical wind tunnel further comprises a fastener for connecting various parts of the vertical wind tunnel. The fastener comprises a first ribbon and a second ribbon having two strips. The first ribbon comprises a first end attached to a part of the vertical wind tunnel to be fastened and a free end covered by hooks from both its sides. The hooks are similar to the hooks of a hook and loop fastener. The second ribbon comprises two separate strips that are connected to each other at its first ends. The first ends of both strips are to another part of the vertical wind tunnel to be fastened. Respective free ends of the strips are covered by loops. The loops are similar to the loops of a hook and loop fastener. Sides of the free ends opposed to each other are covered by loops such that, when the free end of the first ribbon having hooks is inserted between the free ends of the two strips having loops and the free ends of the two strips are pressed together having the free end of the first ribbon therebetween, fastening of both parts of the vertical wind tunnel is performed. The following design allows to make secure constructions. The possibility that some parts of the vertical wind tunnel will separate during the use is greatly reduced, therefore increasing a safety.

DETAILED DESCRIPTION OF THE INVENTION

Figure 1:
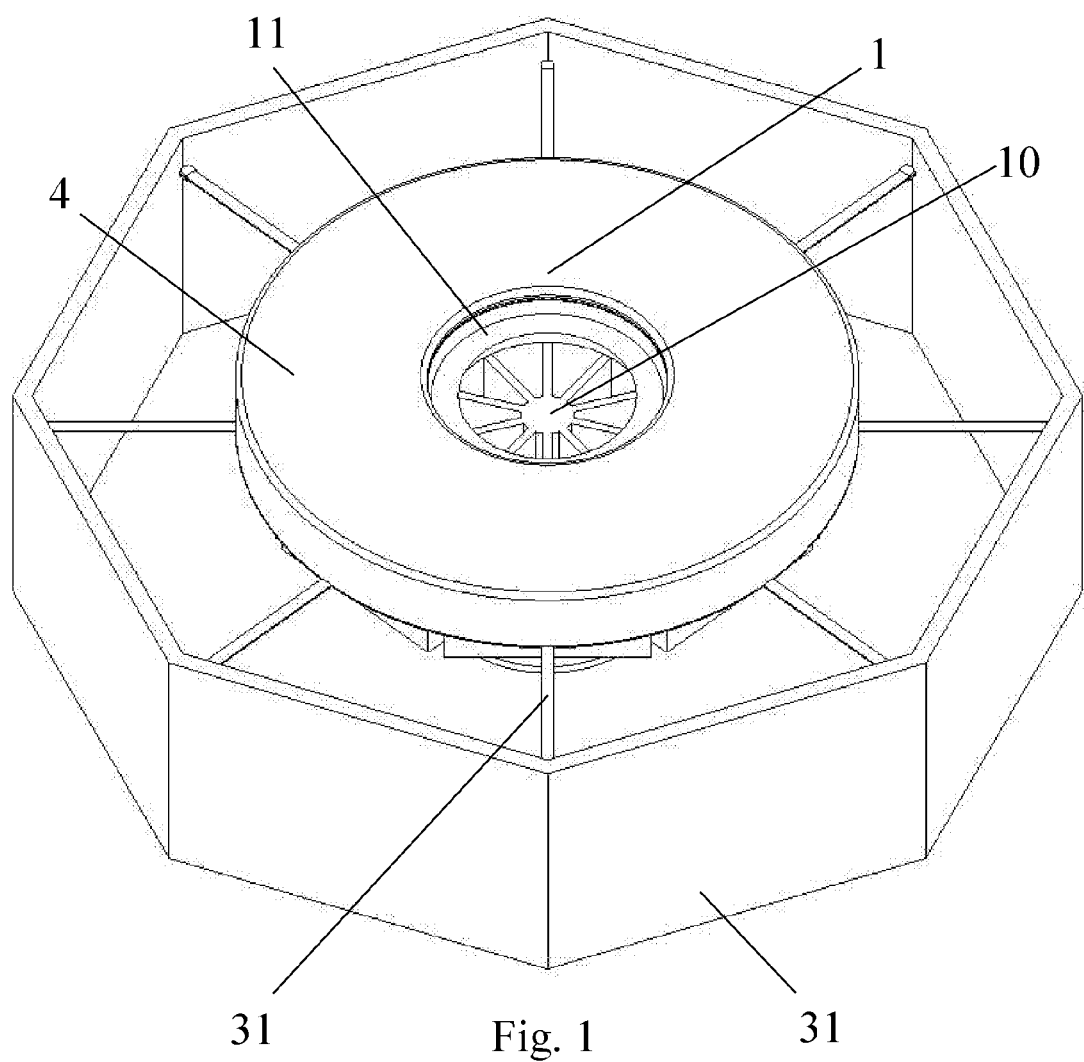
FIG. 1 is an isometric view of a vertical wind tunnel.
Figure 2:
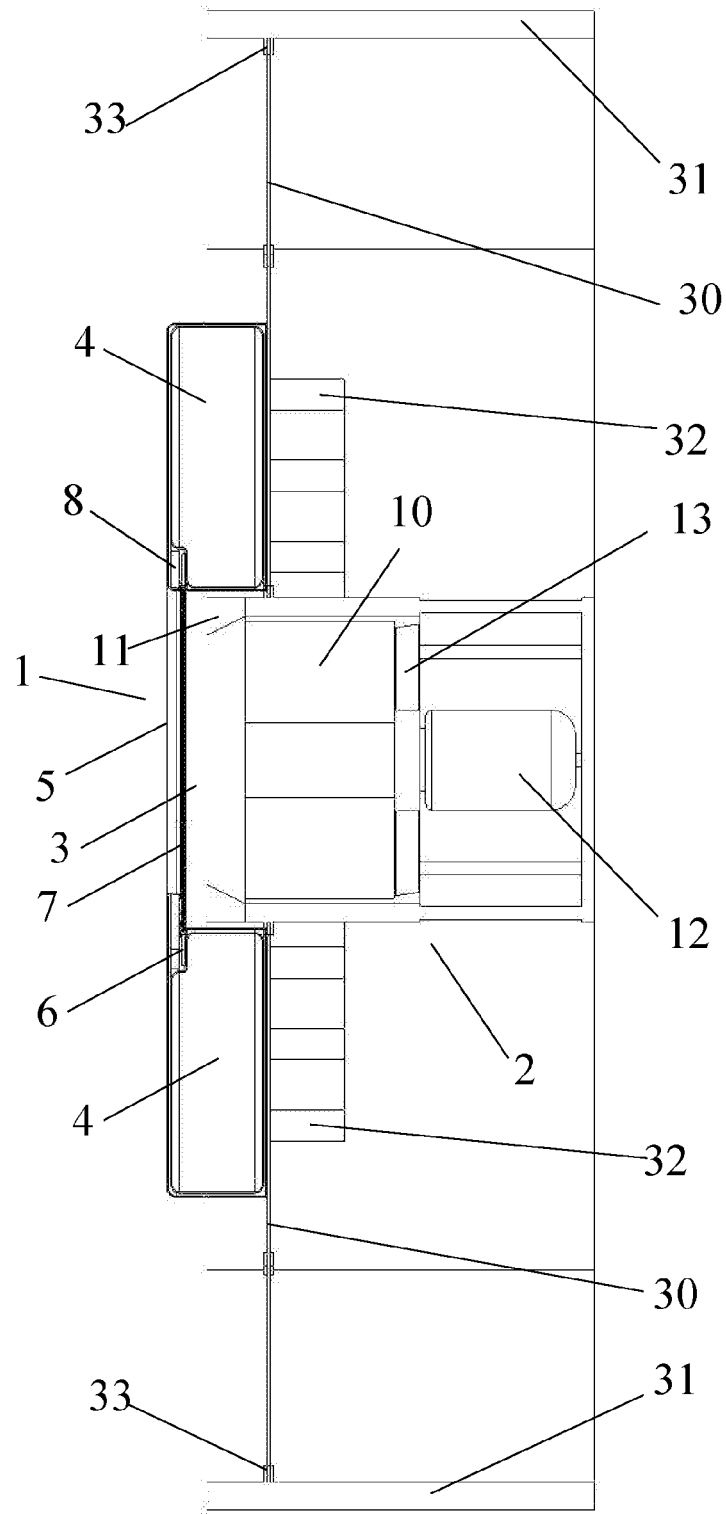
FIG. 2 is a vertical cross-sectional view of a vertical wind tunnel shown in FIG. 1.
Figure 5:
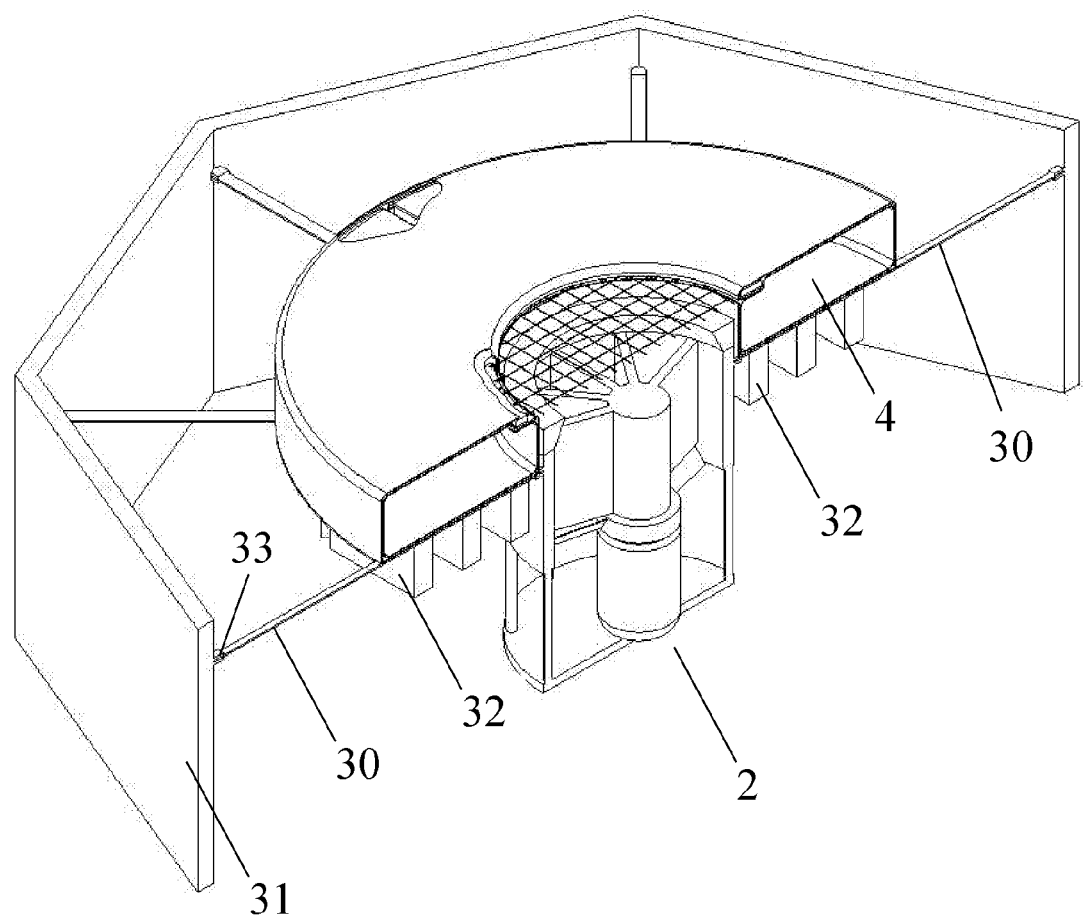
FIG. 5 is an isometric view of a cross-section of a vertical wind tunnel shown in FIG. 1.

FIGS. 1, 2 and 5 show vertical wind tunnel for raising persons by use of air flow comprising a flight platform 1 and an air flow generating device 2 associated with the flight platform 1 and generating a vertical air flow through a channel 3 arranged in a middle of the flight platform 1. The air flow generating device 2 comprises a motor 12 associated with the propeller 13.

The flight platform 1 comprises a safety mattress 4 positioned around the channel 3, a net assembly 5 comprising a flexible net ring 6 and a net 7, an upholstery ring 8 arranged above the flexible net ring 6, and a mattress cover 9.

Figure 3:
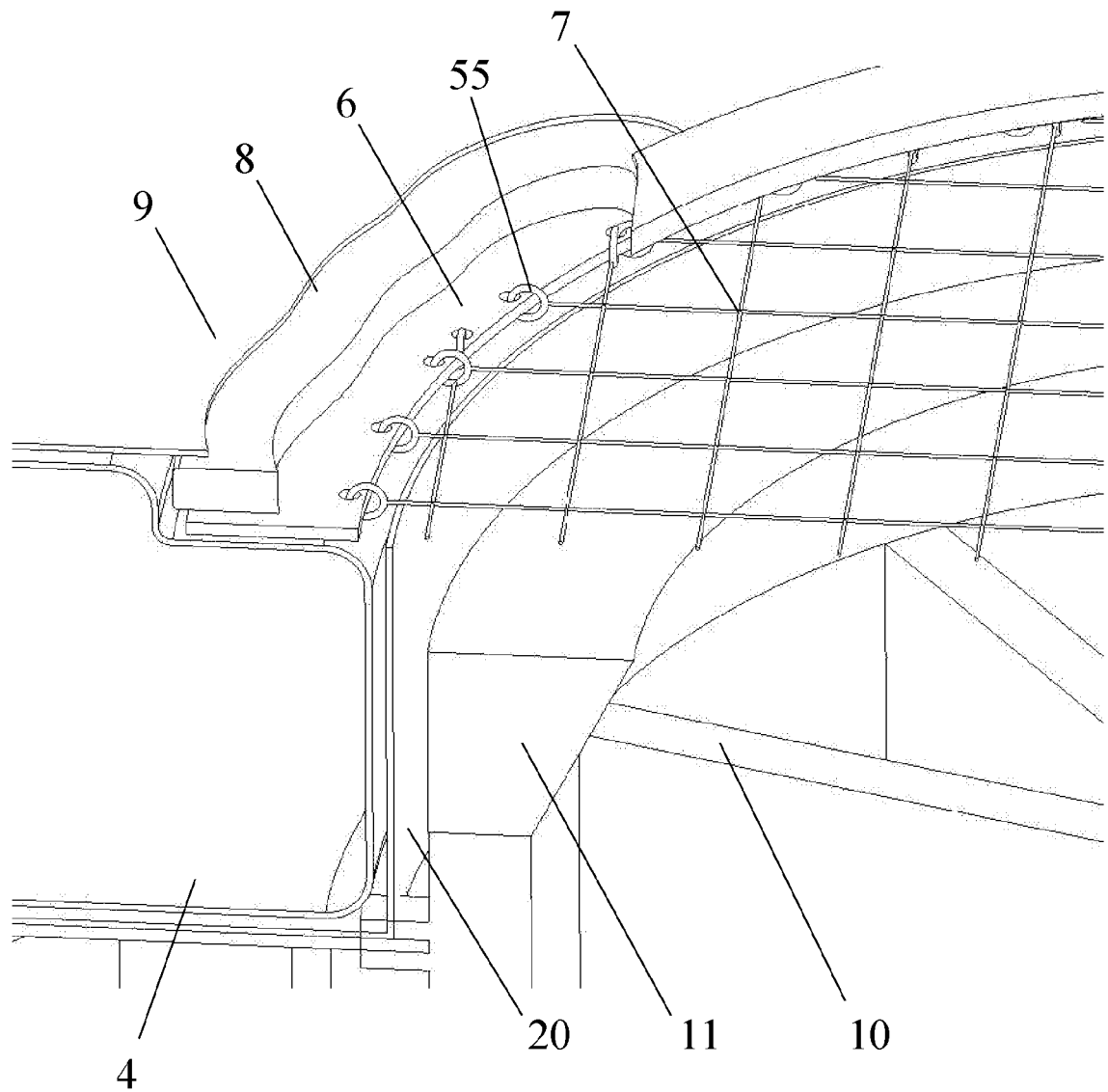
FIG. 3 is a view, partially in section, illustrating arrangement of safety features in the vertical wind tunnel.
Figure 4:
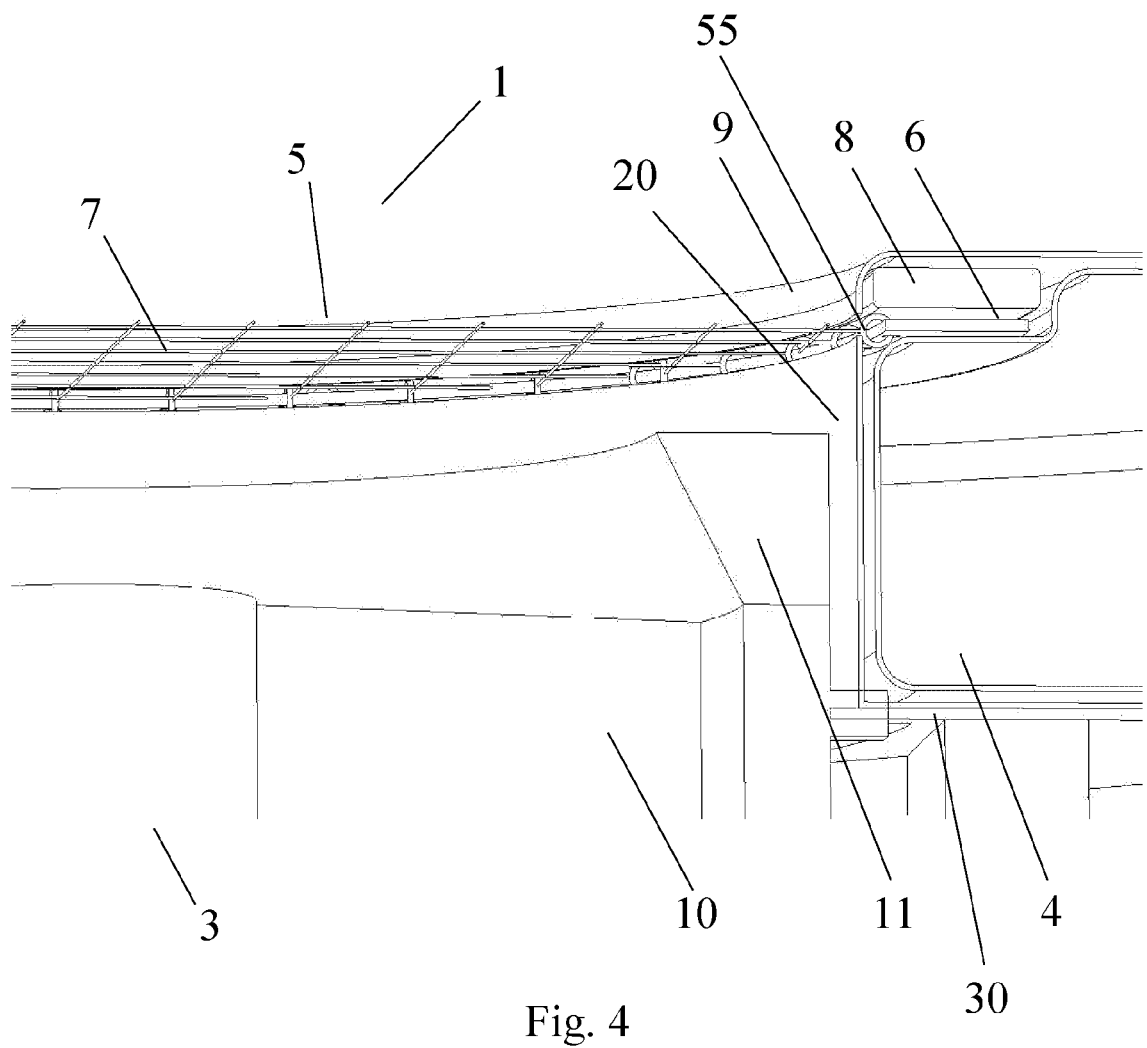
FIG. 4 is a view, partially in section, illustrating arrangement of safety features in the vertical wind tunnel.

FIGS. 3 and 4 show arrangement of the safety mattress 4, the flexible net ring 6, the net 7, the upholstery ring 8, a confusor 11, and a flow straightener 10. The mattress cover 9 is arranged above the safety mattress 4 and the upholstery ring 8 for covering thereof. The upholstery ring 8 is made of polyurethane foam.

The flexible net ring 6 is positioned around the channel 3 and above the safety mattress 4 and the flexible net ring 6 comprises connectors 55 for connecting the net 7 to the flexible net ring 6. FIGS. 3 and 4 show connectors 55 in the form of hole in the flexible net ring 6 and ring at the end of a string of the net. The flexible net ring 6 is made of elastic material such as a glass fibre reinforced plastic.

The flow straightener 10 is positioned below the flight platform 1. The confusor 11 is positioned between the flow straightener 10 and the net assembly 5, wherein a gap is formed between the confusor 11 and the net assembly 5. The confusor 11 is made of polyurethane foam. The confusor 11 is covered with a confusor cover made of PVC to protect the confusor 11 from environmental impact.

The vertical wind tunnel further comprises a channel cover 20 arranged around the channel 3 enclosing thereof, wherein the channel cover 20 is connected to the mattress cover 9.

FIGS. 1 to 5 show a peripheral frame structure 31 spaced around the air flow generating device 2 forming a space, between which a safety mattress 4 is positioned on a level of the flight platform 1. The vertical wind tunnel further comprises flexible straps 30 extending from the air flow generating device 2 up to the peripheral frame structure 31. The first end of the flexible strap 30 is attached to the air flow generating device 2 and the second end of the flexible strap 30 is attached to the peripheral frame structure 7, wherein the safety mattress 4 is supported on the flexible straps 30.

Each flexible strap 30, at one of its ends, comprises a connector 33 for easing assembly and dismantling of the vertical wind tunnel. The connector 33 comprises a tensioning member for tensioning the flexible strap 30 for achieving and maintaining desired tension.

The vertical wind tunnel further comprises sound absorbing walls, which are suspended on the flexible straps 30 for absorbing of noise generated by the power unit 1. The sound absorbing walls are installed in the peripheral frame structure 31 for absorbing of noise generated by the air flow generating device 2.

Figure 6:
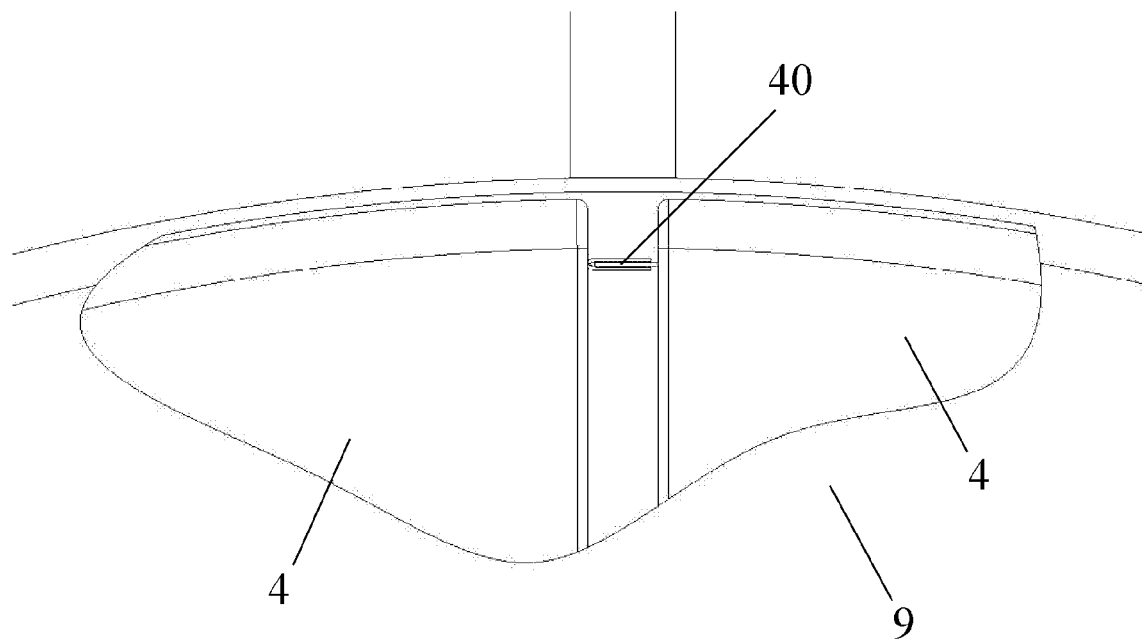
FIG. 6 is close-up view, partially in section, from FIG. 5 illustrating a fastener 40 for fastening together two safety mattresses 4.
Figure 7:
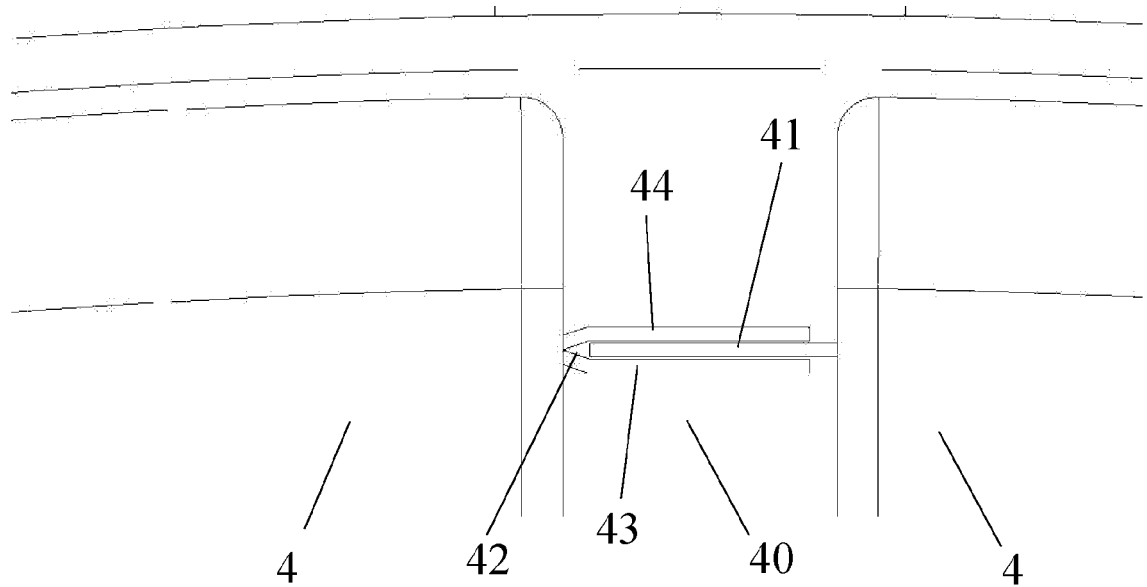
FIG. 7 is a close-up view from FIG. 6 illustrating the fastener 40.

FIG. 6 and FIG. 7 shows a fastener 40 for connecting various parts of the vertical wind tunnel, wherein the fastener 40 comprises a first ribbon 41 and a second ribbon 42.

The first ribbon 41 comprises a first end attached to the safety mattress 4 and a free end covered by hooks from both its sides.

The second ribbon 42 comprises two strips 43 and 44 having first ends attached to the safety mattress 4. Respective free ends of the two strips 43 and 44 are covered by loops. The loops are on sides of the free ends that are opposed to each other. When the free end of the first ribbon 41 is inserted between the free ends of the two strips 43 and 44 and the free ends of the two strips 43 and 44 are pressed together having the free end of the first ribbon 41 therebetween, fastening of both safety mattresses 4 is performed.

While the invention has been described with reference to certain embodiments, it will be understood by those skilled in the art that various changes may be made and equivalents may be substituted without departing from the scope of the invention. Therefore, it is intended that the inventions not be limited to the particular embodiments disclosed herein.

The invention claimed is:

1. A vertical wind tunnel for raising persons by use of air flow, comprising
a flight platform (1);
an air flow generating device (2) associated with the flight platform (1) and generating a vertical air flow through a channel (3) arranged in a middle of the flight platform (1);
the flight platform (1) comprises:
a safety mattress (4) positioned around the channel (3);
a net assembly (5) comprising a flexible net ring (6) and a net (7), wherein the net ring (6) is positioned around the channel (3) and above the safety mattress (4) and the net ring (6) comprises connectors (55) for connecting the net (7) to the net ring (6);
an upholstery ring (8) arranged above the flexible net ring (6) and covers the flexible net ring (6);
a mattress cover (9) arranged above the safety mattress (4) and the upholstery ring (8) for covering thereof.

2. The vertical wind tunnel according to claim 1, characterized in that it further comprises:
a flow straightener (10) positioned below the flight platform (1), and a confusor (11) positioned between the flow straightener (10) and the net assembly (5), wherein a gap is formed between the confusor (11) and the net assembly (5).

3. The vertical wind tunnel according to claim 2, characterized in that the confusor (11) is covered with a confusor cover to protect it from environmental impact.

4. The vertical wind tunnel according to claim 1, characterized in that the confusor (11) is made of polyurethane, preferably of polyurethane foam.

5. The vertical wind tunnel according to claim 1, characterized in that the flexible net ring (6) is made of elastic material, preferably of fibre-reinforced polymer, more preferably of glass fibre reinforced plastic.

6. The vertical wind tunnel according to claim 1, characterized in that the upholstery ring (8) is made of polyurethane, preferably of polyurethane foam.

7. The vertical wind tunnel according to claim 1, characterized in that it further comprises a channel cover (20) arranged around the channel (3) enclosing thereof, wherein the channel cover (20) is connected to the mattress cover (9).

8. The vertical wind tunnel according to claim 1, characterized in that it further comprises:
a peripheral frame structure (31) spaced around the air flow generating device (2) forming a space, between which a safety mattress (4) is positioned on a level of the flight platform (1); and
flexible straps (30) extending from the air flow generating device (2) up to the peripheral frame structure (31), wherein a first end of the flexible strap (30) is attached to the air flow generating device (2) and a second end of the flexible strap (30) is attached to the peripheral frame structure (7), wherein the safety mattress (4) is supported on the flexible straps (30).

9. The vertical wind tunnel according to claim 8, characterized in that each flexible strap (30), at least to one of its ends, comprises a connector (33) for easing assembly and dismantling of the vertical wind tunnel, wherein the connector (33) comprises a tensioning member for tensioning the flexible strap (30) for achieving and maintaining desired tension.

10. A vertical wind tunnel according to claim 8, characterized in that it further comprises sound absorbing walls (32), which are suspended on the flexible straps (30) for absorbing of noise generated by the power unit (1).

11. A vertical wind tunnel according to claim 8, characterized in that the sound absorbing walls are installed in the peripheral frame structure (31) for absorbing of noise generated by the air flow generating device (2).

12. The vertical wind tunnel according to claim 1, characterized in that it further comprises a fastener (40) for connecting various parts of the vertical wind tunnel, wherein the fastener (40) comprises:
a first ribbon (41) comprising a first end attached to a part of the vertical wind tunnel to be fastened and a free end covered by hooks from both its sides; and
a second ribbon (42) comprising two strips (43; 44) that comprises first ends attached to another part of the vertical wind tunnel to be fastened and respective free ends covered by loops on sides of the free ends opposed to each other such that, when the free end of the first ribbon (41) is inserted between the free ends of the two strips (43; 44) and the free ends of the two strips (43; 44) are pressed together having the free end of the first ribbon (41) therebetween, fastening of both parts of the vertical wind tunnel is performed.

* * * * *